(12) United States Patent
Hanaoka

(10) Patent No.: US 12,209,161 B2
(45) Date of Patent: Jan. 28, 2025

(54) AQUEOUS EPOXY RESIN COMPOSITION AND CURED PRODUCT OF SAME

(71) Applicant: MITSUBISHI GAS CHEMICAL COMPANY, INC., Tokyo (JP)

(72) Inventor: Takuma Hanaoka, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 641 days.

(21) Appl. No.: 17/295,241

(22) PCT Filed: Nov. 1, 2019

(86) PCT No.: PCT/JP2019/043029
§ 371 (c)(1),
(2) Date: May 19, 2021

(87) PCT Pub. No.: WO2020/110601
PCT Pub. Date: Jun. 4, 2020

(65) Prior Publication Data
US 2022/0010054 A1    Jan. 13, 2022

(30) Foreign Application Priority Data

Nov. 26, 2018 (JP) ................................ 2018-220453

(51) Int. Cl.
| | | |
|---|---|---|
| C08G 59/50 | (2006.01) | |
| C08G 59/18 | (2006.01) | |
| C08L 63/00 | (2006.01) | |
| C09D 5/02 | (2006.01) | |
| C09D 5/08 | (2006.01) | |
| C09D 163/00 | (2006.01) | |

(52) U.S. Cl.
CPC ....... *C08G 59/5013* (2013.01); *C08G 59/184* (2013.01); *C08L 63/00* (2013.01); *C09D 5/022* (2013.01); *C09D 5/028* (2013.01); *C09D 5/08* (2013.01); *C09D 163/00* (2013.01)

(58) Field of Classification Search
CPC ......... C08L 63/00; C09D 5/08; C09D 163/00; C08G 59/5013; C08G 59/184
See application file for complete search history.

(56) References Cited

U.S. PATENT DOCUMENTS

| 5,356,961 A | 10/1994 | Nishimura et al. |
|---|---|---|
| 5,670,612 A | 9/1997 | Kihara et al. |
| 5,728,439 A * | 3/1998 | Carlblom ................. C08J 7/048 229/87.01 |
| 5,798,398 A | 8/1998 | Shah et al. |
| 11,319,405 B2 * | 5/2022 | Asai ....................... C07C 211/27 |
| 2008/0108617 A1 | 5/2008 | Desai et al. |
| 2009/0291952 A1 | 11/2009 | Desai et al. |
| 2010/0285309 A1 | 11/2010 | Barriau et al. |
| 2011/0212964 A1 | 9/2011 | Desai et al. |
| 2013/0123311 A1 | 5/2013 | Desai et al. |
| 2014/0105859 A1 | 4/2014 | Desai et al. |
| 2015/0011775 A1 | 1/2015 | Desai et al. |
| 2015/0025178 A1 | 1/2015 | Jiang et al. |
| 2015/0225448 A1 | 8/2015 | Desai et al. |
| 2016/0067360 A1 | 3/2016 | Desai et al. |
| 2016/0303088 A1 | 10/2016 | Desai et al. |
| 2017/0143680 A1 | 5/2017 | Desai et al. |
| 2017/0362425 A1 * | 12/2017 | Siddiqui .............. C09D 133/04 |
| 2018/0221348 A1 | 8/2018 | Desai et al. |
| 2019/0112416 A1 | 4/2019 | Sato et al. |
| 2019/0256645 A1 | 8/2019 | Asai et al. |
| 2021/0054135 A1 | 2/2021 | Hanaoka |

FOREIGN PATENT DOCUMENTS

| CN | 101490023 A | 7/2009 |
|---|---|---|
| EP | 3 805 288 A1 | 4/2021 |
| JP | 05-178967 A | 7/1993 |
| JP | 06-178967 A | 6/1994 |
| JP | 08-127637 A | 5/1996 |
| JP | 2001-502378 A | 2/2001 |
| JP | 2001-152124 | 6/2001 |
| JP | 2010-539314 A | 12/2010 |

(Continued)

OTHER PUBLICATIONS

Machine translation of JP-2001152124-A obtained from Espacenet. The original document is included in the IDS dated May 4, 2023. (Year: 2001).*

(Continued)

*Primary Examiner* — Kregg T Brooks
*Assistant Examiner* — David R. Foss
(74) *Attorney, Agent, or Firm* — GREENBLUM & BERNSTEIN, P.L.C.

(57) ABSTRACT

Provided is a water-based epoxy resin composition and a cured product thereof, the water-based epoxy resin composition obtained by blending a water-based epoxy resin (A) and a curing agent composition (B) containing a reaction product (b1) of epichlorohydrin and an amine compound represented by the following formula (1), the water-based epoxy resin composition having a content ratio of the component (A) and the component (B) defined as [number of epoxy groups in component (A)/number of active amine hydrogens in component (B)] of 1/1.1 to 1/0.3:

$$H_2N-CH_2-A-CH_2-NH_2 \quad (1)$$

wherein A is a 1,2-phenylene group, a 1,3-phenylene group, or a 1,4-phenylene group.

7 Claims, No Drawings

(56) References Cited

FOREIGN PATENT DOCUMENTS

| | | |
|---|---|---|
| JP | 2015-511983 A | 4/2015 |
| JP | 2018-083905 A | 5/2018 |
| WO | 2017/175740 A1 | 10/2017 |
| WO | 2018/096868 A1 | 5/2018 |

OTHER PUBLICATIONS

International Search Report issued in International Patent Application No. PCT/JP2019/043029, dated Jan. 28, 2020, along with English translation thereof.
Written Opinion of International Searching Authority issued in International Patent Application No. PCT/JP2019/043029, dated Jan. 28, 2020, along with English translation thereof.

* cited by examiner

AQUEOUS EPOXY RESIN COMPOSITION AND CURED PRODUCT OF SAME

TECHNICAL FIELD

The present invention relates to a water-based epoxy resin composition, and a cured product thereof.

BACKGROUND ART

A polyamine, and a compound obtained by subjecting a polyamine and an alkenyl compound, an epoxy compound, or the like to addition reaction are known to be useful as an epoxy resin curing agent. An epoxy resin composition using the epoxy resin curing agent has been widely used in the paint fields, such as a corrosion-resistant paint for ships, bridges, iron structures on land and sea, in the civil engineering construction fields, such as lining, reinforcement, crack repair materials, sealing materials, injection materials, primers, screeds, topcoats and FRP reinforcement of concrete structures, floor materials of buildings, lining of water supply and sewage systems, paving materials, and adhesives, in the electrical and electronic fields, such as die-attach materials and insulation sealants, and in the fiber reinforced plastic fields.

In the paint fields, solvent regulation has been recently strengthened in terms of environment and safety, so that studies on water-based production of paint have been underway. The water-based production of an epoxy resin-based paint is to use, for example, as a main agent, a water-based epoxy resin emulsified by adding an emulsifier and water to an epoxy resin.

PTL 1 discloses an epoxy curing reagent composition including an epichlorohydrin-metaxylylene diamine reaction product which does not substantially contain metaxylylene diamine, and at least one liquid hydroxyl-functional melting point depressant selected from the group including plasticizer alcohol and aqueous alcohol solvents, and a use of the epoxy curing reagent composition in combination with an epoxy resin aqueous dispersion.

PTL 2 discloses a water-based epoxy resin curing agent that contains a reaction composition containing a reaction product of styrene and a predetermined amine compound, and a water-based epoxy resin composition containing the curing agent and a water-based epoxy resin.

CITATION LIST

Patent Literature

PTL 1: JP 2001-502378 A
PTL 2: WO 2018/096868

SUMMARY OF INVENTION

Technical Problem

For water-based epoxy resin compositions, further improvement in function is required. In general, water-based epoxy resin compositions tend to have a higher viscosity than non-water-based epoxy resin compositions, and therefore there is a demand for a water-based epoxy resin composition having a lower viscosity and excellent workability. Further, for example, when a water-based epoxy resin composition is used for a paint for corrosion resistance, the water-based epoxy resin composition needs to have good chemical resistance. With respect to salt water corrosion resistance among the chemical resistance, it is important for the composition to cause less changes in appearance and to be capable of preventing the occurrence of rust on the surface to be coated even when exposed to salt water for a long time.

Further, when a water-based epoxy resin composition is used for a paint, a pigment or the like may be contained in order to impart coloring properties or concealing properties. However, when a pigment is contained, the adhesiveness of a coating film of the water-based epoxy resin composition to the surface to be coated tends to deteriorate. When the adhesiveness of the coating film deteriorates, for example, the coating film easily peels off when exposed to salt water for a long time, and there is a problem in that sufficient salt water corrosion resistance is not obtained.

A problem to be solved by the present invention is to provide a water-based epoxy resin composition having good workability, a coating film thereof being excellent in adhesiveness and having excellent chemical resistance, in particular salt water corrosion resistance, and a cured product thereof.

Solution to Problem

The present inventor has found that an epoxy resin composition obtained by blending a water-based epoxy resin composition and an epoxy resin curing agent composition having a predetermined structure in a predetermined ratio may solve the above problem.

The present invention relates to the following [1] to [11].

[1] A water-based epoxy resin composition obtained by blending a water-based epoxy resin (A) and a curing agent composition (B) containing a reaction product (b1) of epichlorohydrin and an amine compound represented by the following formula (1), the water-based epoxy resin composition having a content ratio of the component (A) and the component (B) defined as [number of epoxy groups in component (A)/number of active amine hydrogens in component (B)] of 1/1.1 to 1/0.3:

wherein A is a 1,2-phenylene group, a 1,3-phenylene group, or a 1,4-phenylene group.

[2] The water-based epoxy resin composition described in [1], wherein the [number of epoxy groups in component (A)/number of active amine hydrogens in component (B)] is 1/0.8 to 1/0.5.

[3] The water-based epoxy resin composition described in [1] or [2], further comprising a pigment (C).

[4] The water-based epoxy resin composition described in any one of [1] to [3], wherein the reaction product (b1) contains a compound represented by the following formula (2) as a main component.

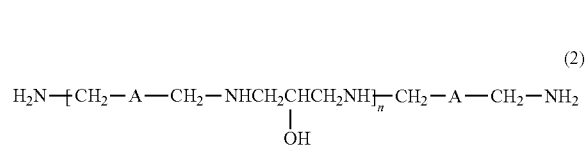

wherein A is the same as defined above, and n is a number of 1 to 12.

[5] The water-based epoxy resin composition described in [4], wherein a ratio of the amine compound represented by the formula (1) with respect to a total amount of the compound represented by the formula (2) and the amine compound represented by the formula (1) in the reaction product (b1) is 20 to 35% by mass.

[6] The water-based epoxy resin composition described in any one of [1] to [5], wherein the curing agent composition (B) comprises 1 to 80% by mass of water.

[7] The water-based epoxy resin composition described in any one of [1] to [6], wherein a total content of the water-based epoxy resin (A) and a curing agent component in the curing agent composition (B) is 50% by mass or more.

[8] The water-based epoxy resin composition described in any one of [3] to [7], wherein the pigment (C) is an inorganic pigment.

[9] The water-based epoxy resin composition described in any one of [3] to [8], wherein a content of the pigment (C) is 5 to 50% by mass.

[10] The water-based epoxy resin composition described in any one of [1] to [9], wherein the water-based epoxy resin composition is a paint for corrosion resistance.

[11] A cured product of the water-based epoxy resin composition described in any one of [1] to [10].

Advantageous Effects of Invention

A water-based epoxy resin composition of the present invention is water-based, and therefore is suitable in terms of the environment and safety, has low viscosity and good workability, and even when a pigment is contained, a coating film thereof is excellent in adhesiveness and has excellent chemical resistance, particularly salt water corrosion resistance. The water-based epoxy resin composition can be suitably used for various paints such as a paint for corrosion resistance, as well as for an adhesive, a floor material, a sealant, a polymer cement mortar, a gas barrier coating, a primer, a screed, a top coat, a sealing material, a crack repair material, a concrete material, and the like.

DESCRIPTION OF EMBODIMENTS

[Water-Based Epoxy Resin Composition]

A water-based epoxy resin composition of the present invention (hereinafter, also simply referred to as "the composition of the present invention") is characterized by being a water-based epoxy resin composition obtained by blending a water-based epoxy resin (A) and a curing agent composition (B) containing a reaction product (b1) of epichlorohydrin and an amine compound represented by the following formula (1), the water-based epoxy resin composition having a content ratio of the component (A) and the component (B) defined as [number of epoxy groups in component (A)/number of active amine hydrogens in component (B)] of 1/1.1 to 1/0.3.

$$H_2N—CH_2—A—CH_2—NH_2 \quad (1)$$

wherein A is a 1,2-phenylene group, a 1,3-phenylene group, or a 1,4-phenylene group.

By blending the above-described component (A) and component (B) in the above-described ratio, the composition of the present invention has low viscosity and good workability, and a coating film thereof is excellent in adhesiveness and has excellent chemical resistance, particularly salt water corrosion resistance. Further, as described later, even when a pigment is contained, good adhesiveness of a coating film can be maintained, and therefore corrosion resistance is exhibited for a long time.

Hereinafter, each component constituting the composition of the present invention will be described.

<Water-Based Epoxy Resin (A)>

The composition of the present invention contains a water-based epoxy resin (A) as a main agent. "Water-based epoxy resin" in the present specification refers to an aqueous epoxy resin, or an epoxy resin usable in an aqueous dispersion state (emulsion). As the component (A) used in the present invention, an epoxy resin emulsion is preferred. A suitable epoxy resin emulsion as the component (A) will now be described.

Examples of the epoxy resin emulsion include emulsions obtained by emulsifying and dispersing an epoxy resin in water. It is preferred that the epoxy resin emulsion is an epoxy resin emulsion containing an epoxy resin, an emulsifier, and water.

The epoxy resin used in the epoxy resin emulsion may be an epoxy resin that has a glycidyl group which reacts with an active hydrogen of the curing agent component in the curing agent composition (B) and that can emulsify and disperse in water. From the viewpoint of the hardness, water resistance, and chemical resistance of a coating film to be obtained, an epoxy resin including an aromatic ring or an alicyclic structure in the molecule thereof is preferred.

Specific examples of the epoxy resin used in the epoxy resin emulsion include at least one resin selected from the group consisting of an epoxy resin having a glycidylamino group derived from metaxylylene diamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group and a glycidyloxy group derived from paraaminophenol, an epoxy resin having a glycidyloxy group derived from bisphenol A, an epoxy resin having a glycidyloxy group derived from bisphenol F, an epoxy resin having a glycidyloxy group derived from phenol novolac, and an epoxy resin having a glycidyloxy group derived from resorcinol.

Among them, from the viewpoint of the hardness, water resistance, and chemical resistance of a coating film to be obtained, it is more preferred that the epoxy resin used in the epoxy resin emulsion includes, as a main component, at least one selected from the group consisting of an epoxy resin having a glycidylamino group derived from metaxylylene diamine, an epoxy resin having a glycidyloxy group derived from bisphenol A, and an epoxy resin having a glycidyloxy group derived from bisphenol F, it is even more preferred that the epoxy resin includes, as a main component, at least one selected from the group consisting of an epoxy resin having a glycidyloxy group derived from bisphenol A and an epoxy resin having a glycidyloxy group derived from bisphenol F, and it is still even more preferred that the epoxy resin includes, as a main component, an epoxy resin having a glycidyloxy group derived from bisphenol A. Here, "main component" means that other components may be included without departing from the gist of the present invention, and means preferably 50 to 100% by mass, more preferably 70 to 100% by mass, and even more preferably 90 to 100% by mass of the total components.

The epoxy resin used in the epoxy resin emulsion may be either a solid epoxy resin or a liquid epoxy resin. In the present invention, "solid epoxy resin" means an epoxy resin which is a solid at room temperature (25° C.), and "liquid epoxy resin" means an epoxy resin which is a liquid at room temperature (25° C.).

An epoxy equivalent weight of an epoxy resin used in an epoxy resin emulsion is preferably 150 g/equivalent weight or more, from the viewpoint of the hardness, water resistance and chemical resistance of a coating film of a water-based epoxy resin composition to be obtained, and is preferably 1,000 g/equivalent weight or less and more preferably 800 g/equivalent weight or less, from the viewpoint of the low viscosity or the curability of the water-based epoxy resin composition.

In the case of an epoxy resin emulsion in which an epoxy resin is dispersed in a dispersion medium in the presence of an emulsifier, it is preferred that an epoxy equivalent weight of a component (that is, solid content including the epoxy resin and the emulsifier) in which the dispersion medium is removed from the emulsion is also within the range.

The epoxy resins used in the epoxy resin emulsion may be used alone and may be used in combination of two or more thereof.

The concentration of the epoxy resin in the epoxy resin emulsion is not particularly limited, but is preferably 30% by mass or more and more preferably 40% by mass or more, and typically 80% by mass or less.

As the emulsifier used in the epoxy resin emulsion, it is possible to use any of a nonionic emulsifier, an anionic emulsifier, a cationic emulsifier, an amphoteric emulsifier, and a reactive group-containing emulsifier having a reactive group. At least one selected from the group consisting of nonionic emulsifiers, anionic emulsifiers, and reactive group-containing emulsifiers is preferable, and nonionic emulsifiers are more preferable, from the viewpoint that there is a broad curing agent selection range.

Examples of the nonionic emulsifier include a polyether-based compound, an ester-based compound, an alkanol-amide-based compound, and the like. The emulsifier may be used alone and may be used in combination of two or more thereof.

The content of the emulsifier in the epoxy resin emulsion is preferably 0.1 to 40 parts by mass, more preferably 0.5 to 30 parts by mass, and even more preferably 1 to 20 parts by mass, with respect to 100 parts by mass of the epoxy resin. When the emulsifier is 0.1 parts by mass or more with respect to 100 parts by mass of the epoxy resin, the emulsion stability of the epoxy resin is good, and when the emulsifier is 40 parts by mass or less, the hardness, water resistance, chemical resistance, appearance, and the like of a coating film of a water-based epoxy resin composition to be obtained can be well maintained.

The epoxy resin emulsion which is component (A) may contain a component other than the epoxy resin, the emulsifier, and water, but the total content of the epoxy resin, the emulsifier, and water is preferably 70% by mass or more, more preferably 80% by mass or more, and even more preferably 90% by mass or more, and the upper limit thereof is 100% by mass.

Examples of the component other than the epoxy resin, the emulsifier, and water include an aqueous solvent. Examples of the aqueous solvent include protic polar solvents such as methanol, ethanol, 1-propanol, 2-propanol, 1-butanol, 2-butanol, 2-methoxyethanol, 2-ethoxyethanol, 2-propoxyethanol, 2-butoxyethanol, 1-methoxy-2-propanol, 1-ethoxy-2-propanol, and 1-propoxy-2-propanol, aprotic polar solvents such as N,N-dimethylformamide, N,N-dimethylacetamide, dimethylsulfoxide, and N-methylpyrrolidone, and the like. These aqueous solvents may be used either alone or in combination of two or more thereof. Among these, a protic polar solvent is preferable from the viewpoint of improving workability by lowering the viscosity of the component (A).

Examples of a commercially available epoxy resin emulsion which may be used as the component (A) include commercially available products, such as "W2801", "W2821R70", "W3435R67", "W8735R70", "W1155R55", and "W5654R45", which are jER series manufactured by Mitsubishi Chemical Corporation, "EM-101-50" manufactured by ADEKA Corporation, "EPICLON EXA-8610" manufactured by DIC Corporation, "PZ 3901", "PZ 3921", and "PZ 3961-1", which are Araldite series manufactured by Huntsman Advanced Materials, Inc., "DER 915" and "DER 917" manufactured by Olin Corporation, and "Resin 3520-WY-55" and "Resin 6520-WH-53", which are EPIREZ series manufactured by Hexion Specialty Chemicals.

<Curing Agent Composition (B)>

The composition of the present invention is obtained by blending, as a component (B), a curing agent composition containing a reaction product (b1) of epichlorohydrin and an amine compound represented by the following formula (1):

$$H_2N-CH_2-A-CH_2-NH_2 \qquad (1)$$

wherein A is a 1,2-phenylene group, a 1,3-phenylene group, or a 1,4-phenylene group.

By blending the curing agent composition as the component (B), the composition of the present invention has low viscosity and good workability, and even when a pigment is contained, a coating film thereof is excellent in adhesiveness and has excellent chemical resistance, particularly salt water corrosion resistance.

(Reaction Product (b1))

The reaction product (b1) is a reaction product of epichlorohydrin and the amine compound represented by the formula (1).

In the formula (1), A is preferably a 1,3-phenylene group or a 1,4-phenylene group, and more preferably a 1,3-phenylene group. That is, the amine compound represented by the formula (1) is at least one selected from the group consisting of orthoxylylene diamine, metaxylylene diamine (MXDA), and paraxylylene diamine (PXDA), one or more selected from the group consisting of metaxylylene diamine and paraxylylene diamine is preferred, and metaxylylene diamine is more preferred.

It is preferred that the reaction product (b1) contains a compound represented by the following formula (2) as a main component. The "main component" as referred to herein refers to a component whose content is 50% by mass or more based on 100% by mass of the entire constituent components in the reaction product (b1):

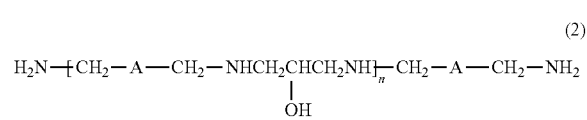

$$H_2N-[CH_2-A-CH_2-NHCH_2\underset{OH}{CHCH_2}NH]_n-CH_2-A-CH_2-NH_2 \qquad (2)$$

wherein A is the same as defined above, and n is a number of 1 to 12.

The content of the compound represented by the formula (2) in the reaction product (b1) is preferably 60% by mass or more, more preferably 65% by mass or more, and even more preferably 72% by mass or more. The upper limit is 100% by mass.

In addition, from the viewpoint of obtaining good curing performance as the curing agent, a compound having a high ratio of a compound with n=1 occupied in the compound represented by the formula (2) is preferred. A content of the compound with n=1 represented by the formula (2) in the reaction product (b1) is preferably 15% by mass or more, and more preferably 20% by mass or more.

The content of the compound represented by the formula (2) in the reaction product (b1) and the composition of the compound represented by the formula (2) may be obtained by a gas chromatography (GC) analysis and a gel permeation chromatography (GPC) analysis.

An active hydrogen equivalent weight (AHEW) of the reaction product (b1) is preferably 100 or less, more preferably 90 or less, and even more preferably 80 or less. When the AHEW of the reaction product (b1) is 100 or less, the reaction product (b1) exhibits higher curability even though the amount of reaction product (b1) blended in the composition of the present invention is small. The AHEW of the reaction product (b1) is preferably 45 or more, and more preferably 50 or more, from the viewpoint of ease of production, and the like. The AHEW of the reaction product (b1) may be obtained by, for example, a titration method.

Further, the ratio of the amine compound represented by the formula (1) with respect to the total amount of the compound represented by the formula (2) and the amine compound represented by the formula (1) in the reaction product (b1) is preferably 20 to 35% by mass, and more preferably 24 to 28% by mass. When the content of the amine compound (that is, the starting material diamine) represented by the formula (1) in the reaction product (b1) is 20% by mass or more, the viscosity of the water-based epoxy resin composition can be easily lowered and workability is improved. When the content is 35% by mass or less, the water resistance of the coating film of the water-based epoxy resin composition becomes good.

The reaction product (b1) is obtained by subjecting epichlorohydrin and the diamine (hereinafter also referred to as "starting material diamine") represented by the formula (1) to reaction.

The reaction of epichlorohydrin and the starting material diamine may be performed by a well-known method, and the method is not particularly limited, but it is preferred that the reaction is performed in the presence of a basic catalyst from the viewpoint of reaction efficiency. As the basic catalyst, an alkali metal hydroxide is preferred, one or more selected from the group consisting of potassium hydroxide and sodium hydroxide are more preferred, and sodium hydroxide is even more preferred. The alkali metal hydroxide may be used in a solid state or in an aqueous solution state, but it is more preferred that the alkali metal hydroxide is used in an aqueous solution state. A concentration of the aqueous alkali metal hydroxide aqueous solution is preferably within a range of 30 to 55% by mass.

In the reaction of epichlorohydrin and the starting material diamine, an amount of basic catalyst used is preferably approximately equimolar to epichlorohydrin, and preferably 0.7 to 2.0 mol, more preferably 0.8 to 1.5 mol, and even more preferably 0.9 to 1.2 mol, with respect to 1 mol of epichlorohydrin used.

For the used amounts of epichlorohydrin and the starting material diamine, from the viewpoint of obtaining a compound with n=1 among the compounds represented by the formula (2) at a high selectivity, a molar ratio of the starting material diamine to 1 mol of epichlorohydrin ranges preferably from 1.5 to 12 mol, more preferably 1.5 to 6.0 mol, and even more preferably from 1.8 to 3.0 mol.

It is preferred that the reaction of epichlorohydrin and the starting material diamine is performed by mixing the starting material diamine and the basic catalyst in advance, and then adding epichlorohydrin thereto. For example, the reaction is performed by charging the starting material diamine and the basic catalyst into a reactor, heating the mixture while stirring the mixture under an inert atmosphere such as a nitrogen gas, and adding epichlorohydrin thereto. The method for adding epichlorohydrin is not particularly limited, but examples thereof include a method for adding epichlorohydrin into a reactor by using a dropping funnel or a liquid feeding pump, and the like.

The temperature at the time of adding epichlorohydrin is preferably 40 to 100° C. and more preferably 50 to 80° C. After the addition of epichlorohydrin is completed, the reaction temperature may be increased in order to improve the reaction efficiency, and the temperature at the time of the reaction is preferably 55 to 120° C. When the reaction temperature is 55° C. or more, the addition reaction of epichlorohydrin and the starting material diamine is efficiently performed.

The time for the reaction is not particularly limited, and typically, is preferably 10 minutes to 6 hours and more preferably 20 minutes to 4 hours after the addition of epichlorohydrin is completed. When the time for the reaction is 10 minutes or more, an amount of unreacted starting material remaining is small, and when the time for the reaction is 6 hours or less, the time is advantageous in terms of productivity.

After completion of the reaction, the obtained reaction liquid contains an addition reaction product of epichlorohydrin and a starting material diamine, unreacted starting material diamine, a basic catalyst, and water and a salt produced by the reaction. For the salt, for example, when an alkali metal hydroxide is used as the basic catalyst, an alkali metal chloride is produced.

The basic catalyst may be removed by filtration, washing, adsorption, and the like according to the type thereof. The water produced by the reaction may be removed, for example, under a reduced pressure condition at a temperature of 100° C. or less. Further, the salt produced by the reaction may be removed by filtration, and the like.

The reaction product (b1) may be obtained by removing the basic catalyst, water, and the salt from the reaction liquid as described above. Further, an operation of removing unreacted starting material diamine may be carried out, if necessary.

The curing agent composition (B) may further contain a curing agent component other than the reaction product (b1). Examples of the "other curing agent component" include a polyamine compound and modified products thereof other than the reaction product (b1) and the starting material diamine.

Further, a well-known curing accelerator, a non-reactive diluent, or the like may also be blended with the curing agent composition (B), within a range not impairing the effects of the present invention. Examples of the curing accelerator include tris(dimethylaminomethyl)phenol, benzyl alcohol, salicylic acid, triphenyl phosphite, styrenated phenol, bisphenol A, N,N'-bis(3-(dimethylamino)propyl)urea, and mercaptan-terminated polysulfide compounds such as "Thiokol LP-3" (manufactured by Toray Fine Chemicals Co., Ltd.).

However, the content of the reaction product (b1) contained in the curing agent composition (B) is, based on the total amount of the curing agent component, preferably 70% by mass or more, more preferably 80% by mass or more, and even more preferably 90% by mass or more, from the viewpoint of obtaining the effects of the present invention. The upper limit is 100% by mass.

An active hydrogen equivalent weight (AHEW) of the curing agent composition (B) is preferably 800 or less, more preferably 500 or less, and even more preferably 400 or less. When the AHEW of the curing agent composition is lower, a higher curability is exhibited even when the blending amount to the water-based epoxy resin composition is small. On the other hand, the AHEW of the curing agent composition (B) is preferably 45 or more, and more preferably 70 or more, from the viewpoint of obtaining excellent hardness and chemical resistance in a coating film of a water-based epoxy resin composition. Further, the AHEW of the curing agent composition (B) refers to, in the case where component (B) is a solution or a dispersion, the as-is AHEW.

The curing agent composition (B) may further contain a co-solvent in order to improve the workability by lowing the viscosity of the composition of the present invention. Examples of the co-solvent include water and an aqueous solvent, and water is preferable from the viewpoint of the environment and safety.

When the curing agent composition (B) contains water as a co-solvent, the content of water in the curing agent composition (B) is preferably 1 to 80% by mass, more preferably 15 to 70% by mass, and even more preferably 30 to 60% by mass, from the viewpoint of improving the workability by lowering the viscosity of the composition of the present invention.

(Content Ratio)

The content ratio of the component (A) and the component (B) in the water-based epoxy resin composition of the present invention defined as [number of epoxy groups in component (A)/number of active amine hydrogens in component (B)] is 1/1.1 to 1/0.3, and preferably 1/0.8 to 1/0.5. When the content ratio is in the range of 1/1.1 to 1/0.3, the obtained coating film is excellent in adhesiveness and has excellent chemical resistance, particularly salt water corrosion resistance. Further, even when the composition further contains a pigment, the adhesiveness and chemical resistance of the coating film can be maintained.

From the viewpoint of the adhesiveness and chemical resistance of the coating film, as well as curability, the [number of epoxy groups in component (A)/number of active amine hydrogens in component (B)] is more preferably 1/0.8 to 1/0.6.

The total content of the water-based epoxy resin (A) and the curing agent component in the curing agent composition (B) in the water-based epoxy resin composition of the present invention is preferably 50% by mass or more, and more preferably 55% by mass or more. Having a content of 50% by mass or more is advantageous in terms of adhesiveness and chemical resistance of the obtained coating film, as well as in terms of the curing rate. The upper limit of the content is 100% by mass, preferably 99% by mass or less, and more preferably 98% by mass or less. When the pigment (C) or the like is further blended, the upper limit of the content is more preferably 95% by mass or less, even more preferably 90% by mass or less, and still more preferably 85% by mass or less. As referred to herein, the "curing agent component in the curing agent composition (B)" means a component having an active amine hydrogen.

<Pigment (C)>

A pigment may be further blended to the composition of the present invention as a component (C). The type of the pigment is not particularly limited, and either an organic pigment or an inorganic pigment can be used depending on the use of the composition, and these may be used in combination.

Examples of the organic pigment include polycyclic pigments such as azo lake, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, and a quinophthalone pigment, dye lakes such as basic dye-type lakes and acidic dye-type rakes, nitro pigments, nitroso pigments, aniline black, daylight fluorescent pigments, and the like.

Examples of the inorganic pigment include inorganic white pigments such as titanium oxide, iron oxide, calcium carbonate, barium sulfate, and aluminum hydroxide, as well as barium yellow, cadmium red, chrome yellow, carbon black, and the like.

For example, when the composition of the present invention is applied to various paints, such as a paint for corrosion resistance, an inorganic pigment is preferable, an inorganic white pigment is more preferable, and titanium oxide is even more preferable, from the viewpoint of weather resistance and concealing properties.

The above-described pigments can be used alone or in combination of two or more thereof.

When the pigment (C) is blended in the composition of the present invention, the content thereof is preferably 1 to 50% by mass, more preferably 5 to 50% by mass, still more preferably 10 to 40% by mass, and even more preferably 15 to 35% by mass in the composition of the present invention. When the content is 1% by mass or more, a coloring property can be imparted, and when the content is 50% by mass or less, the adhesiveness, chemical resistance, and curability of the obtained coating film can be maintained.

In the water-based epoxy resin composition of the present invention, other than a pigment (C), a filler, a modifying component such as a plasticizer, a flow control component such as a thixotropic agent, a leveling agent, a dispersant, a defoamer, a tackifier, and the like may also be included according to the use.

A production method of the water-based epoxy resin composition of the present invention is not particularly limited, and the water-based epoxy resin (A), the curing agent composition (B), and the pigment (C) and other components, if necessary, may be mixed and produced by using well-known methods and apparatuses.

When an epoxy resin emulsion containing an epoxy resin, an emulsifier, and water is used as the water-based epoxy resin (A), a water-based epoxy resin composition may be formulated by firstly blending and mixing the curing agent composition (B) with the epoxy resin and the emulsifier which are starting materials for the epoxy resin emulsion, then adding water thereto dividedly, and mixing the mixture. By this operation, it is possible to emulsify and disperse the epoxy resin (A) in water, and simultaneously formulate a water-based epoxy resin composition, so that it is possible to obtain a composition having a good dispersed state of the epoxy resin.

The content of water in the water-based epoxy resin composition of the present invention is preferably 5% by mass or more, preferably 10% by mass or more, and more preferably 15% by mass or more. The upper limit of the content of water may be appropriately adjusted according to the concentration of the water-based epoxy resin composition, but is typically 80% by mass or less, and preferably 70% by mass or less.

Further, the composition of the present invention preferably does not contain an organic solvent other than the above-described aqueous solvent, and the content thereof is preferably 10% by mass or less, more preferably 5% by mass or less, and still more preferably 2% by mass or less.

<Use>

The water-based epoxy resin composition of the present invention has good curability, and a coating film obtained therefrom is excellent in adhesiveness and has excellent chemical resistance, particularly salt water corrosion resistance. Therefore, the water-based epoxy resin composition can be suitably used for various paints such as a paint for corrosion resistance, as well as for an adhesive, a floor material, a sealant, a polymer cement mortar, a gas barrier coating, a primer, a screed, a top coat, a sealing material, a crack repair material, a concrete material, and the like. The paint for corrosion resistance is used as a paint for ships, bridges, buildings such as factories, and other land and sea iron structures, for example.

[Cured Product]

A cured product of the water-based epoxy resin composition of the present invention (hereinafter, also simply referred to as "the cured product of the present invention") is a cured product obtained by curing the above-described water-based epoxy resin composition of the present invention by a well-known method. The curing conditions of the water-based epoxy resin composition are appropriately selected according to the use and the form, and are not particularly limited.

The form of the cured product of the present invention is also not particularly limited, and may be selected according to the use. For example, when the water-based epoxy resin composition is a paint for corrosion resistance, a cured product of the water-based epoxy resin composition is usually a film-like cured product. It is preferred that the cured product of the present invention is a film-like cured product because excellent hardness and chemical resistance, particularly salt water corrosion resistance, can be exhibited.

EXAMPLES

Hereinafter, the present invention will be described in detail with reference to Examples and Comparative Examples, but the present invention is not limited to the following Examples. Further, the water-based epoxy resin composition were evaluated by the following methods.

(Viscosity)

The viscosity of the curing agent composition at 25° C. was measured using an E-type viscometer "TVE-22H-type viscometer cone plate type" manufactured by Toki Sangyo Co., Ltd.

(Dry to the Touch)

A zinc phosphate-treated iron plate (manufactured by PALTECH Co., Ltd.; SPCC-SD PB-N144 0.8×70×150 mm) was used as a base material. A water-based epoxy resin composition of each example was applied using an applicator onto the base material to form a coating film (thickness immediately after application: 200 μm). This coating film was kept under the conditions of 23° C. and 50% R.H., and after 1 day passed, was evaluated by finger contact according to the following criteria.

Ex: Excellent (there is no sticking of the coating film even when the thumb is pressed with a force of about 50 N, and no fingerprints remain)

G: Good (there is no sticking of the coating film even when the thumb is pressed with a force of about 50 N, but fingerprints remain after finger contact)

F: Fair (there is sticking of the coating film when the thumb is pressed with a force of about 50 N)

P: Poor (there is sticking of the coating film when the thumb is pressed with a force of about 5 N)

(Pencil Hardness)

A water-based epoxy resin composition of each example was applied onto a base material (zinc phosphate-treated iron plate) in the same manner as described above to form a coating film (thickness immediately after application: 200 μm). This coating film was kept under the conditions of 23° C. and 50% R.H., and after 1, 2, and 7 days passed, the pencil hardness was measured in accordance with JIS K5600-5-4:1999.

(Water Resistance Spot Test)

A water-based epoxy resin composition of each example was applied onto a base material (zinc phosphate-treated iron plate) in the same manner as described above to form a coating film (thickness immediately after application: 200 μm). This coating film was kept under the conditions of 23° C. and 50% R.H., and after 1, 2, and 7 days passed, 2 to 3 drops of pure water were dropped on the surface of the coating film with a dropper, and the portion was covered with a 50 mL screw tube bottle. After 24 hours passed, water was wiped off, and the appearance was observed visually and evaluated according to the following criteria.

Ex: Excellent (no change at all)

G: Good (slight change, but no problem with use)

F: Fair (some whitening)

P: Poor(whitening)

(Curing Rate (RCI))

The water-based epoxy resin composition in each example was applied onto a glass plate (manufactured by Taiyu Machinery Co., Ltd., 25×348×2.0 mm) under the conditions of 23° C. and 50% R.H., by using an applicator of 76 μm, thereby forming a coating film. The glass plate on which the coating film was formed was set on a paint drying time measuring instrument (manufactured by Taiyu Machinery Co., Ltd.), the striations when the needle of the measuring instrument scratched the surface of the coating film were observed, and the time to reach each drying step (Set to Touch, Dust Free, and Dry Through) was measured according to the following criteria. A shorter time indicates a higher curing rate.

Set to Touch: time taken until when traces of the needle start to remain on the glass plate Dust Free: time taken until when the needle emerges from the middle of the coating film onto the surface of the coating film Dry Through: time taken until when no traces of the needle remain on the coating film (Appearance of Coating Film)

A water-based epoxy resin composition of each example was applied onto a base material (zinc phosphate-treated iron plate) in the same manner as described above to form a coating film (thickness immediately after application: 200 μm). This coating film was kept under the conditions of 23° C. and 50% R.H., and after 7 days passed, the appearance was observed visually to evaluate smoothness according to the following criteria.

<Smoothness>

Ex: Excellent (there is no unevenness)

G: Good (there is slight unevenness, but there is no problem with use)

F: Fair (there is some unevenness)

P: Poor (there is cissing or unevenness on the whole surface)

(Chemical Resistance)

A water-based epoxy resin composition of each example was applied onto a base material (zinc phosphate-treated iron plate) in the same manner as described above to form a coating film (thickness immediately after application: 200 μm), and a test specimen was produced by sealing a non-coated part of the base material with a rust preventive paint ("Million Primer" and "Million Clear", manufactured by Kansai Paint Co., Ltd.). This test specimen was kept under the conditions of 23° C. and 50% R.H., and after 14 days passed, the chemical resistance of the test specimen was evaluated.

<5% Salt Water Spray Test>

For the salt water spray test, after the test specimen was placed in a salt water spray tester ("STP-90" manufactured by Suga Test Instruments Co., Ltd., in-bath temperature 35° C.), and continuously sprayed for 1, 2, 3, and 4 weeks with salt water (concentration 5% by mass), the appearance thereof was observed visually and evaluated according to the following criteria. Further, the presence or absence of spot rust was checked by visually observing the surface of the base material in contact with the coating film.

Ex: No spot rust on the base material and no change in coating film appearance

G: A small amount of spot rust on the base material, but there is no problem with use F: There is spot rust on the base material P: There is a large amount of spot rust on the base material <Crosscut Test>

A water-based epoxy resin composition of each example was applied onto a base material (zinc phosphate-treated iron plate) in the same manner as described above to form a coating film (thickness immediately after application: 200 μm). A test specimen was produced having two diagonally-intersecting incisions of 50 mm in length cut using a cutter knife in accordance with JIS K5600-7-9:2006 on the coating film surface after 14 days of storage under the conditions of 23° C., 50% R.H.

After the test specimen was placed in a salt water spray tester ("STP-90" manufactured by Suga Test Instruments Co., Ltd., in-bath temperature 35° C.), and continuously sprayed with salt water (concentration 5% by mass) for 1, 2, 3, and 4 weeks, the appearance thereof was observed visually to check for the presence or absence of peeling of the coating film. For test specimens in which peeling was not observed, the width (mm) of rust of the base material that occurred at the crosscut site was checked. The smaller the rust width, the better the corrosion resistance.

Production Example 1

(Production of Pigment-Containing Water-Based Epoxy Resin 1)

A pigment-containing water-based epoxy resin 1, which is a main agent composition containing the water-based epoxy resin (A) and the pigment (C), was obtained by blending and stirring the components in the amounts shown in Table 1 to disperse the titanium oxide, which is the pigment (C). The blended amounts (g) and % by mass shown in Table 1 are all as-is values.

TABLE 1

|  | Blended Amount (g) | % By Mass |
|---|---|---|
| (A) Water-based epoxy resin PZ 3961-1 *1 | 100.00 | 62.39 |
| (C) Inorganic white pigment (titanium oxide) *2 | 43.24 | 26.98 |
| Dispersant *3 | 2.30 | 1.44 |
| Defoamer *4 | 0.74 | 0.46 |
| Aqueous solvent (1-methoxy-2-propanol) | 1.37 | 0.86 |
| Pure water | 12.64 | 7.89 |
| Total | 160.29 | 100.00 |

The components used in Table 1 are shown below.

*1: "Araldite PZ 3961-1" manufactured by HUNTSMAN Advanced Materials, water-based emulsion of a solid epoxy resin having a glycidyloxy group derived from bisphenol A, epoxy equivalent (solid content): 503 g/equivalent, solid content concentration: 53% by mass, water content: 40% by mass, methoxypropanol content: 7% by mass

*2: "CR-97" manufactured by Ishihara Sangyo Co., Ltd., white titanium oxide (rutile type), average particle size: 0.25 μm

*3: "Disper BYK-2081" manufactured by BYK-Chemie Japan Co., Ltd.

*4: "Disparlon AQ-530S" manufactured by Kusumoto Chemicals Co., Ltd.

Production Example 2

(Production of Curing Agent Composition "G-328W")

A curing agent composition "G-328W" was obtained by mixing a water-based epoxy resin curing agent "Gaskamine 328" (reaction product of epichlorohydrin and metaxylylene diamine (MXDA), manufactured by Mitsubishi Gas Chemical Company, Inc., MXDA content: 26.7% by mass, content of compound represented by the following formula (2-1): 73.3% by mass (n is a number from 1 to 12, and the content of the compound with n=1 is 20.9% by mass), AHEW: 55) and pure water in a mass ratio of 50/50. The viscosity of the G-328W at 25° C. was 33 mPa·s.

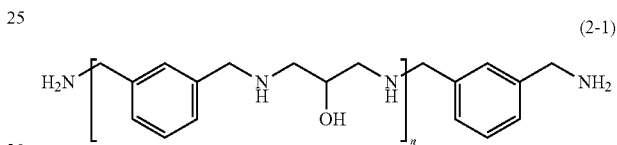

(2-1)

Production Example 3

(Production of Curing Agent Composition "NX-8101W" for Comparison)

A curing agent composition "NX-8101W" for comparison was obtained by mixing a water-based epoxy resin curing agent "Cardolite NX-8101" (manufactured by Cardolite Corporation, solid content concentration: 50% by mass, AHEW (as-is): 270) and pure water in a mass ratio of 67/33. The viscosity of NX-8101W at 25° C. was 6,510 mPa·s.

Examples 1 to 5 and Comparative Example 1

(Production and Evaluation of Water-Based Epoxy Resin Compositions)

Water-based epoxy resin compositions were prepared by mixing the pigment-containing water-based epoxy resin 1 obtained in Production Example 1, which is a main agent composition containing the water-based epoxy resin (A) and the pigment (C), and "G-328W", which is the curing agent composition obtained in Production Example 2 in the ratios shown in Table 2. The above-described evaluations were carried out using the obtained water-based epoxy resin composition. The results are shown in Table 2.

Comparative Example 2

A water-based epoxy resin composition was prepared by mixing the pigment-containing water-based epoxy resin 1 obtained in Production Example 1 and "NX-8101W", which is the curing agent composition obtained in Production Example 3 in the ratios shown in Table 2. The above-described evaluations were carried out using the obtained water-based epoxy resin composition. The results are shown in Table 2.

TABLE 2

|  |  |  | Example | | | | | Comparative Example | |
|---|---|---|---|---|---|---|---|---|---|
|  |  |  | 1 | 2 | 3 | 4 | 5 | 1 | 2 |
| Resin composition blend | Main agent composition | Type | Pigment-containing water-based epoxy resin 1 | | | | | | |
|  |  | Blended amount (g) | 100 | 100 | 100 | 100 | 100 | 100 | 100 |
|  | Curing agent composition | Type | G-328W | G-328W | G-328W | G-328W | G-328W | G-328W | NX-8101W |
|  |  | Blended amount (g) | 3.7 | 4.4 | 5.1 | 5.9 | 7.4 | 8.8 | 21.2 |
|  | Total content (% by mass) of water-based epoxy resin (A) and curing agent component in curing agent composition | | 61.9 | 61.9 | 61.8 | 61.7 | 61.5 | 61.4 | 63.2 |
|  | Content (% by mass) of pigment (C) | | 26.0 | 25.8 | 25.7 | 25.5 | 25.1 | 24.8 | 22.3 |
|  | Number of epoxy groups/ number of active amine hydrogens | | 1/0.5 | 1/0.6 | 1/0.7 | 1/0.8 | 1/1 | 1/1.2 | 1/0.8 |
| Evaluation results | Dry to the touch (after 1 day passed) | | Ex | Ex | Ex | Ex | Ex | Ex | Ex |
|  | Pencil hardness (after 1/2/7 days passed) | | HB/F/H | HB/HB/H | H/H/H | H/H/H | H/H/H | H/H/3H | HB/HB/F |
|  | Water resistance spot (after 1/2/7 days passed) | | F/F/F | F/F/F | F/F/F | F/F/F | F/F/F | F/F/F | F/F/F |
|  | Curing rate (RCI) | Set to Touch (time:min) | 0:01 | 0:01 | 0:01 | 0:01 | 0:01 | 0:01 | 0:01 |
|  |  | Dust Free (time:min) | 1:00 | 1:00 | 1:00 | 0:45 | 0:30 | 1:00 | 1:00 |
|  |  | Dry Through (time:min) | 6:00 | 3:30 | 3:30 | 3:00 | 3:15 | 2:00 | 3:15 |
|  | Coating film appearance | Smoothness | G | G | G | G | G | G | G |
|  | Chemical resistance | 5% Salt water spray (after 1/2/3/4 weeks passed) | G/G/G/G | Ex/Ex/G/G | G/G/G/G | G/G/G/G | G/G/F/F | G/G/—/— | Ex/—/—/— |
|  |  | Crosscut test - presence or absence of peeling (after 1/2/3/4 weeks passed) | no peeling | no peeling | no peeling | no peeling | no peeling | peeling after 2 weeks passed | peeling after 1 week passed |
|  |  | Crosscut test - rust width of crosscut site (mm) (after 1/2/3/4 weeks passed) | ≤1/≤1/1/1 | ≤1/1/1/2 | 1/1/2/2 | ≤1/1/2/2 | ≤1/1/1/1 | ≤1/—/—/— | — |

Example 6

A water-based epoxy resin composition was prepared using the water-based epoxy resin "Araldite PZ 3961-1" (manufactured by HUNTSMAN Advanced Materials) as the main agent and "G-328W", which is the curing agent composition obtained in Production Example 2, as the curing agent composition by mixing the main agent and the curing agent composition in the ratios shown in Table 3. The above-described evaluations were carried out using the obtained water-based epoxy resin composition. The results are shown in Table 3.

Reference Example 1

A water-based epoxy resin composition was prepared using, instead of the curing agent composition "G-328W" used in Example 2, "Gaskamine 240" (reaction product of styrene and MXDA, manufactured by Mitsubishi Gas Chemical Company, Inc.) as the curing agent composition, and mixing the main agent and the curing agent composition in the ratios shown in Table 3. The evaluations were carried out using the obtained water-based epoxy resin composition. The results are shown in Table 3.

Reference Example 2

A water-based epoxy resin composition was prepared using, instead of the curing agent composition "G-328W" used in Example 6, "Gaskamine 240" (reaction product of styrene and MXDA, manufactured by Mitsubishi Gas Chemical Company, Inc.) as the curing agent composition, and mixing the main agent and the curing agent composition in the ratios shown in Table 3. The evaluations were carried out using the obtained water-based epoxy resin composition. The results are shown in Table 3.

TABLE 3

|  |  |  | Example | | | Reference Example | |
|---|---|---|---|---|---|---|---|
|  |  |  | 2 | 5 | 6 | 1 | 2 |
| Resin composition blend | Main agent or main agent composition | Type | Pigment-containing water-based epoxy resin 1 | Pigment-containing water-based epoxy resin 1 | Water-based epoxy resin PZ3961-1 | Pigment-containing water-based epoxy resin 1 | Water-based epoxy resin PZ3961-1 |
|  |  | Blended amount (g) | 100 | 100 | 100 | 100 | 100 |
|  | Curing agent composition | Type | G-328W | G-328W | G-328W | G-240 | G-240 |
|  |  | Blended amount (g) | 4.4 | 7.4 | 5.1 | 6.8 | 11 |
|  | Total content (% by mass) of water-based epoxy resin (A) and curing agent component in curing agent composition |  | 61.9 | 61.5 | 97.6 | 64.8 | 100 |
|  | Content (% by mass) of pigment (C) |  | 25.8 | 25.1 | 0 | 25.3 | 0 |
|  | Number of epoxy groups/ number of active amine hydrogens |  | 1/0.6 | 1/1 | 1/0.6 | 1/1 | 1/1 |
| Evaluation results | Dry to the touch (after 1 day passed) |  | Ex | Ex | Ex | Ex | Ex |
|  | Pencil hardness (after 1/2/7 days passed) |  | HB/HB/H | H/H/H | F/F/H | HB/F/H | H/H/H |
|  | Water resistance spot (after 1/2/7 days passed) |  | F/F/F | F/F/F | F/F/F | F/F/F | Ex/Ex/Ex |
|  | Curing rate (RCI) | Set to Touch (time:min) | 0:01 | 0:01 | 0:01 | 0:01 | 0:01 |
|  |  | Dust Free (time:min) | 1:00 | 0:30 | 2:00 | 1:30 | 2:45 |
|  |  | Dry Through (time:min) | 3:30 | 3:15 | 5:15 | 6:00 | 20:00 |
|  | Coating film appearance | Smoothness | G | G | G | G | G |
|  | Chemical resistance | 5% Salt water spray (after 1/2/3/4 weeks passed) | Ex/Ex/G/G | G/G/F/F | G/G/F/F | P/P/P/P | Ex/Ex/G/G |
|  |  | Crosscut test - presence or absence of peeling (after 1/2/3/4 weeks passed) | no peeling | no peeling | no peeling | no peeling | no peeling |
|  |  | Crosscut test - rust width of crosscut site (mm) (after 1/2/3/4 weeks passed) | ≤1/1/1/2 | ≤1/1/1/1 | ≤1/1/1/1 | 2/3/3/4 | 1/2/2/2 |

The components used in Table 3 are shown below.
<Main Agent Composition>
Pigment-containing water-based epoxy resin 1:
Main agent composition obtained in Production Example 1 containing the water-based epoxy resin (A) and the pigment (C).
<Main Agent (Water-Based Epoxy Resin (A))>
Water-based epoxy resin PZ 3961-1:
Water-based emulsion of a solid epoxy resin having a glycidyloxy group derived from bisphenol A ("Araldite PZ 3961-1" manufactured by HUNTSMAN Advanced Materials), epoxy equivalent (solid content): 503 g/equivalent, solid content concentration: 53% by mass, water content: 40% by mass, methoxypropanol content: 7% by mass
<Curing Agent Composition>
G-328W: Curing agent composition obtained in Production Example 2
<Curing Agent Composition (for Reference Examples)>
G-240: Reaction product of styrene and MXDA ("Gaskamine 240" manufactured by Mitsubishi Gas Chemical Company, Inc., MXDA content: <1% by mass, content of compound represented by the following formula (3): 49% by mass, AHEW: 103)

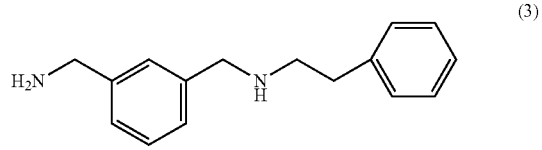 [SMILES: NCc1cccc(CNCCc2ccccc2)c1]

(3)

As shown in Table 2, compared with the water-based epoxy resin compositions of Comparative Examples 1 and 2, the coating films composed of the water-based epoxy resin compositions of Examples 1 to 5 were less susceptible to peeling from the base material even in a crosscut test carried out under 5% salt spray conditions, and exhibited excellent corrosion resistance with little occurrence of rust of the base material on which the coating film is formed. Further, as shown in Table 3, the coating films composed of the water-based epoxy resin composition of the present invention had high corrosion resistance under 5% salt spray conditions regardless of the presence or absence of a pigment.

INDUSTRIAL APPLICABILITY

A water-based epoxy resin composition of the present invention is water-based, and therefore is suitable in terms of the environment and safety, has low viscosity and good workability, and even when a pigment is contained, a coating film thereof is excellent in adhesiveness and has excellent chemical resistance, particularly salt water corrosion resistance. The water-based epoxy resin composition can be suitably used for various paints such as a paint for corrosion resistance, as well as for an adhesive, a floor material, a sealant, a polymer cement mortar, a gas barrier coating, a primer, a screed, a top coat, a sealing material, a crack repair material, a concrete material, and the like.

The invention claimed is:

1. A water-based epoxy resin composition obtained by blending a water-based epoxy resin emulsion (A) and a curing agent composition (B) containing a reaction product (b1) of epichlorohydrin and an amine compound represented by the following formula (1), further comprising a pigment (C), wherein the water-based epoxy resin composition having a content ratio of the component (A) and the component (B) defined as [number of epoxy groups in component (A)/number of active amine hydrogens in component (B)] of 1/0.8 to 1/0.5;

wherein the reaction product (b1) contains a compound represented by the following formula (2) whose content is 50% by mass or more based on 100% by mass of the entire constituent components in the reaction product (b1), and wherein a ratio of the amine compound represented by the formula (1) with respect to a total amount of the compound represented by the formula (2) and the amine compound represented by the formula (1) in the reaction product (b1) is 20 to 35% by mass:

wherein A is a 1,2-phenylene group, a 1,3-phenylene group, or a 1,4-phenylene group, and

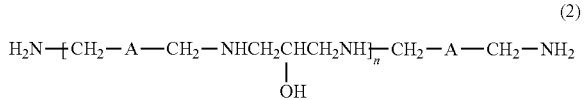

wherein A is the same as defined above, and n is a number of 1 to 12.

2. The water-based epoxy resin composition according to claim 1, wherein the curing agent composition (B) comprises 1 to 80% by mass of water.

3. The water-based epoxy resin composition according to claim 1, wherein a total content of the water-based epoxy resin emulsion (A) and a curing agent component in the curing agent composition (B) is 50% by mass or more.

4. The water-based epoxy resin composition according to claim 1, wherein the pigment (C) is an inorganic pigment.

5. The water-based epoxy resin composition according to claim 1, wherein a content of the pigment (C) is 5 to 50% by mass.

6. The water-based epoxy resin composition according to claim 1, wherein the water-based epoxy resin composition is a paint for corrosion resistance.

7. A cured product of the water-based epoxy resin composition according to claim 1.

* * * * *